United States Patent
Petzold et al.

(10) Patent No.: US 6,873,908 B2
(45) Date of Patent: Mar. 29, 2005

(54) METHODS AND DEVICE FOR MANAGING TRAFFIC DISTURBANCES FOR NAVIGATION DEVICES

(75) Inventors: Bernd Petzold, Wunstorf (DE); Cornelius Hahlweg, Hildesheim (DE); Gerd Draeger, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 09/958,088

(22) PCT Filed: May 2, 2001

(86) PCT No.: PCT/DE01/00457

§ 371 (c)(1),
(2), (4) Date: Jan. 7, 2002

(87) PCT Pub. No.: WO01/57475

PCT Pub. Date: Aug. 9, 2001

(65) Prior Publication Data

US 2002/0161518 A1 Oct. 31, 2002

(30) Foreign Application Priority Data

Feb. 4, 2000 (DE) ........................................ 100 04 969

(51) Int. Cl.[7] ............................ G06F 19/00; G06G 7/70; G01C 21/00
(52) U.S. Cl. ........................ 701/210; 701/208; 701/209; 701/117; 701/118; 701/119; 340/995.13; 340/995.19; 340/905; 340/995.16; 340/995.18
(58) Field of Search ................................ 701/210, 207, 701/208, 209, 117, 118, 119; 340/990, 991, 995.12, 995.13, 995.19, 905, 993, 995.16, 995.18

(56) References Cited

U.S. PATENT DOCUMENTS

| 5,504,482 A | 4/1996 | Schreder ...................... 380/995 |
| 5,844,505 A | 12/1998 | Van Ryzin ................... 380/988 |
| 5,911,773 A | 6/1999 | Mutsuga et al. ............ 701/200 |
| 6,356,836 B1 * | 3/2002 | Adolph ...................... 701/208 |

FOREIGN PATENT DOCUMENTS

| DE | 44 29 121 | 2/1996 |
| DE | 197 34 365 | 2/1999 |
| DE | 198 24 272 | 12/1999 |
| DE | 198 39 378 | 3/2000 |
| EP | 0 782 118 | 7/1997 |
| EP | 0 921 509 | 6/1999 |
| JP | 11 351 895 | 12/1999 |
| WO | WO 98/28727 | 7/1998 |

* cited by examiner

Primary Examiner—Thomas G. Black
Assistant Examiner—Brian J Broadhead
(74) Attorney, Agent, or Firm—Kenyon & Kenyon

(57) ABSTRACT

A method and a device are described for managing traffic-relevant events in a vehicle-based navigation system. A traffic information database, which can be updated by the driver in particular through prioritized driver queries initiated by the system concerning the traffic situation is managed in the navigation system. Thus observations made by the driver during his trip can be stored in the database as traffic information and used for updated route planning.

18 Claims, 3 Drawing Sheets

METHODS AND DEVICE FOR MANAGING TRAFFIC DISTURBANCES FOR NAVIGATION DEVICES

FIELD OF THE INVENTION

The present invention relates to a method and a device for managing traffic-relevant events in a vehicle-based navigation system.

BACKGROUND INFORMATION

Although it can be used in any navigation system, the present invention and the underlying problem are explained with reference to an on-board navigation system of an automobile.

Today's navigation systems are basically composed of the following subsystems: a digital road map, a system management unit itself, a position locator unit, a travel route determination unit, interfaces to the vehicle sensor system in order to detect vehicle movements, an input unit for operating the system, and an output unit for destination guidance, as well as a destination guidance unit and, optionally, a communications system for connection to external traffic information centers.

The digital road map is usually carried along on mass storage systems, normally CD ROMs, in the navigation system. The digital road map may contain road networks with varying coverage (for example, Germany only) or also varying details (for example, highway network and city street network of certain regions).

If the navigation system is activated, the driver can input his desired destination via keyboard and menu selection. After the position of the vehicle has been determined and entered into the system, the travel route determining unit initiates an algorithm which calculates an optimum route to the destination. The driver is essentially guided along this route to his destination.

In certain navigation systems the route can also be optimized according to certain parameters such as distance optimization or time optimization.

If the driver deviates from the precalculated route for any reason, such as not paying sufficient attention or, for example because he did not notice an exit sign, or due to other events such as encountering a construction site, a traffic jam, any other traffic problem or disturbance, a new route is calculated and the travel directions are generated anew.

Navigation systems also offer the possibility to dynamically take into account and respond to traffic problems reported via a traffic radio transmitter in the route planning. This results for example in updated route planning where a reported traffic jam is to be bypassed.

Decisions by the driver to deviate from the route proposed by the system based on his experiences, his intuition, or the spontaneous recognition of a certain traffic situation, however, do not enter in the route planning of the navigation system.

Previously such events could be neither input into the system nor evaluated for relevance as traffic problems in any manner. However, this would be extremely useful for such regions of the traffic networks for which insufficient traffic information is provided such as regional roads or state roads.

SUMMARY OF THE INVENTION

The method according to the present invention and the corresponding device have the advantage compared to the known methods and devices that, in particular for the last-named secondary roads for which no or insufficient traffic problems are reported, an updated route plan can be generated from the traffic information based on the driver's observation or automatically.

The idea on which the present invention is based is basically managing a database for traffic information hereinafter referred to as a TI database in the navigation system which can be updated by the driver, in particular through prioritized queries initiated by the system regarding the traffic situation. In this manner, observations made by the driver during his travel are stored in the database as traffic information and used for an updated route plan. These observations are in agreement with the personal judgment of the driver and with his individual driving behavior.

Such an improved route plan can be made available to the driver during the same trip or when he next travels the same route or on his way back. This traffic information is stored in the system and taken into account for additional route planning. The traffic information that may result in an updated route plan is preferably reported to the system through a prioritized query. In particular, if the system is voice controlled, the driver is only slightly distracted by it. According to the present invention, such a prioritized query asks for the reason why the driver is deviating from the proposed route. This mechanism can be advantageously used in the most diverse situations. For example, if a construction site is reported to the navigation system as a traffic problem by a traffic radio transmitter, the destination guidance normally suggests that this construction site be bypassed. However, if the driver still decides for the route through the construction site, an evaluation of the traffic problem is provided according to the present invention by the driver to the navigation device, for example, in the form "construction site represents no major delay" or "delete construction site from database," etc.

According to one advantageous refinement, the navigation system has a device for analyzing the events, which allows the events to be evaluated regarding their relevance as traffic problems. In this manner, different relevances can be assigned to different events.

According to another preferred refinement, the events can be obtained automatically from the vehicle's event horizon from measurements during travel and they can be stored with the respective road segment as its attribute. The measured values themselves, such as when the speed of the vehicle is measured, or values derived from the measurements can be merged with the traffic information as evaluations. In particular, the variation of speed over time, i.e., the evenness of the vehicle speed, or the ambient temperature or mechanical vibrations of the vehicle such as occurring when traveling on a pothole-covered street, can thus be processed and merged with the evaluation as appropriate.

Furthermore, attributes such as the time of day and/or the day of the week can additionally be stored with the respective road segment. This can be helpful in recognizing periodically occurring events such as traffic jams mainly occurring on Friday afternoon or Monday morning. Thus the navigation system can be provided with empirical knowledge for example in order not to warn the driver when he is on the road on a Tuesday afternoon instead. This, of course, presupposes the possibility of using a date function and a clock in the navigation system.

According to another preferred embodiment, the driver himself can assign specific attributes to one or more road segments of a route. This can be basically done prior to starting a trip or during the trip. Such attributes may include, for example, "stretch often icy," "stretch has no gas station," "stretch has shopping or rest facilities." The number of these attributes can be expanded almost indefinitely and they can be adapted to the individual needs of the user of the navigation system. Thus the navigation system can be enriched with personal, empirically acquired knowledge.

Furthermore, in a preferred manner the information acquired from an analysis of the events can advantageously be forwarded to an external traffic information center. This has the advantage that certain types of traffic information which may be relevant to the general public can be quickly spread via a traffic radio transmitter.

DETAILED DESCRIPTION

In the figures, the same reference symbols denote the same or equivalent components.

Figure 1:
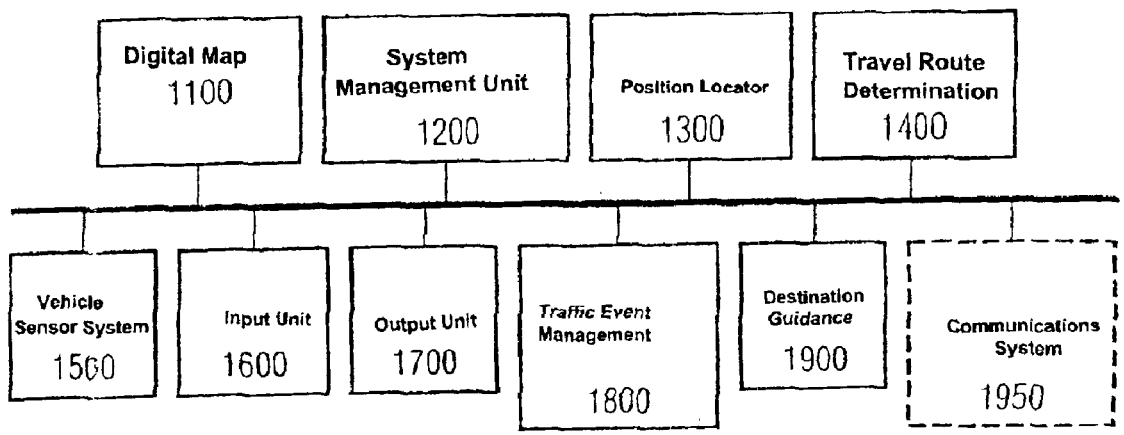
FIG. 1 shows an overall system for managing traffic-relevant events according to one embodiment of the present invention.

FIG. 1 shows an overall system for managing traffic-relevant events according to one embodiment of the present invention.

The overall system has a digital road map 1100, a system management unit 1200, a position locator unit 1300, a travel route determination unit 1400, at least interfaces to the vehicle sensor system, in particular for detecting a measured value for the vehicle's speed 1500, an input unit 1600, an output unit 1700, a destination guidance unit 1900, a communications system 1950, which is equipped for transmitting information to a traffic center, and a component 1800, which is used for managing the traffic events, in particular traffic-relevant events such as traffic problems.

Figure 2:
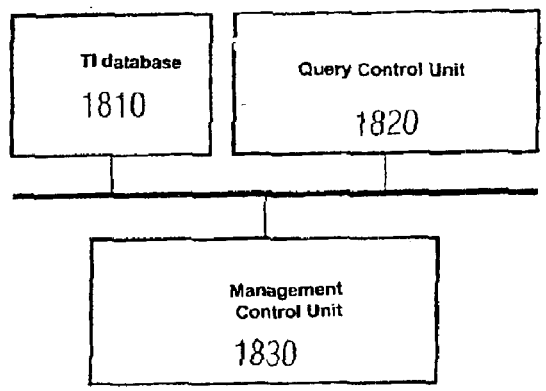
FIG. 2 shows the device for managing traffic events from FIG. 1 with more accurate details.

FIG. 2 shows the device for managing traffic events 1800 from FIG. 1 with more accurate details.

Device 1800 contains a unit 1810 for storing traffic information, henceforward referred to as the TI database. Furthermore, device 1800 contains a unit 1820 for controlling queries of the current traffic situation and a unit 1830 for traffic information management control.

Figure 3:
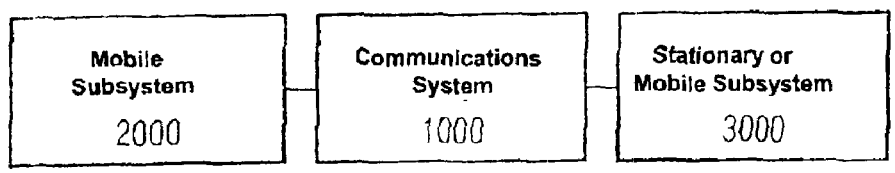
FIG. 3 shows a possible variant of the overall system.

FIG. 3 shows a possible variant of the overall system.

In the overall system shown in FIG. 3, travel directions, traffic information, and, if appropriate, safety-relevant instructions to the driver and the respective position data can be transmitted from a stationary unit 3000 to a mobile navigation subsystem 2000 via a communications system 1000. Device 1800 may be arranged in either system 2000 or system 3000.

Figure 4:
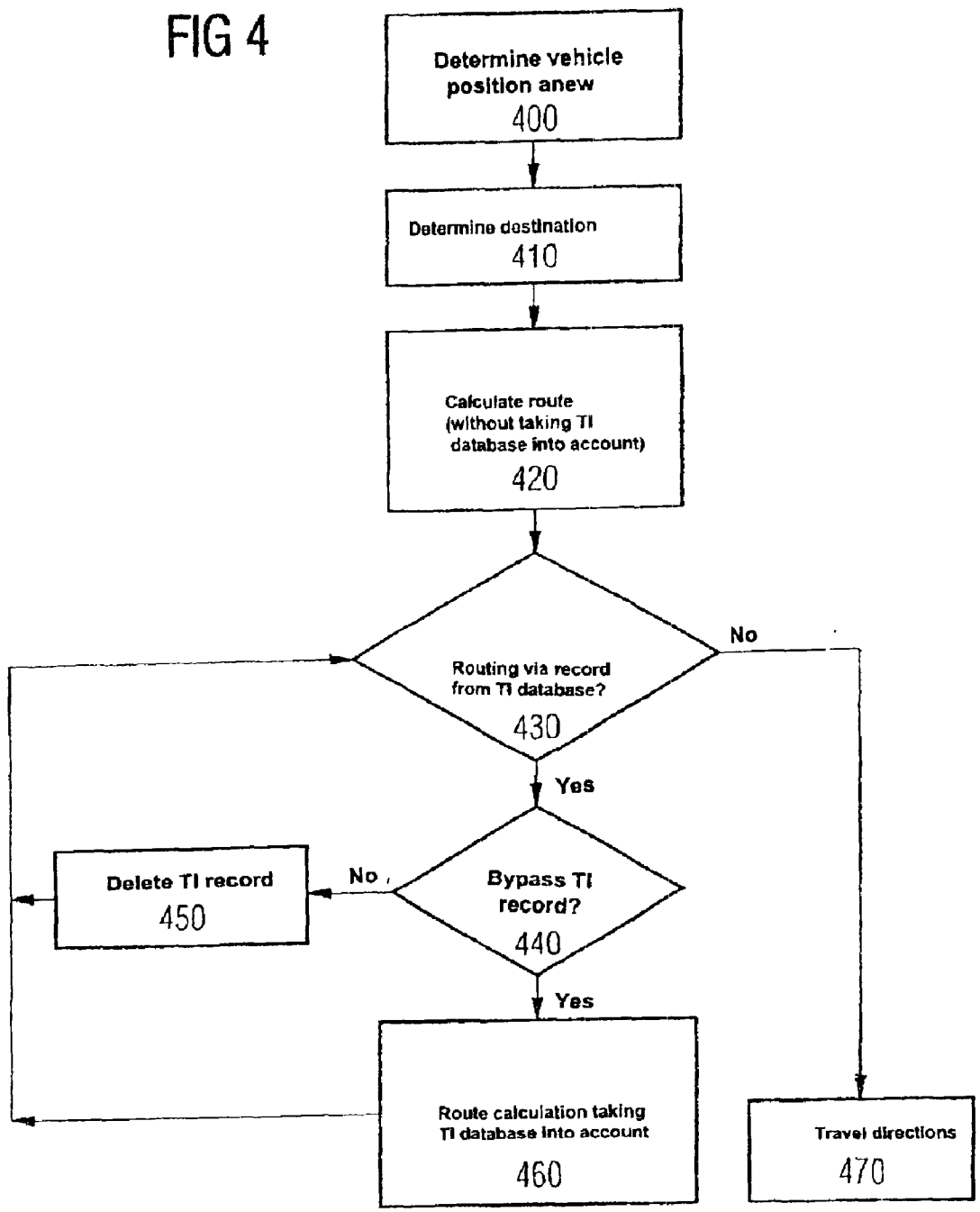
FIG. 4 shows the procedure for determining the optimum route prior to initiating the trip.

FIG. 4 shows the procedure for determining the optimum route prior to initiating the trip.

The method can be carried out using an overall system such as schematically shown in FIG. 1. Reference is additionally made to FIG. 1 in order to explain the functions of the individual components of the overall system.

The overall system should be accommodated in a motor vehicle in the form of a navigation system.

First, the current position of the vehicle is determined by the navigation device or input by the user in a step 400. Subsequently, in a step 410, the destination of the route is queried and entered into the system.

Furthermore, in a step 420, the route planning is advantageously performed by travel route determination unit 1400 without taking into account the TI database.

Subsequently, in a step 430, the algorithm compares the individual route segments with the road segments of the TI database in order to determine whether or not individual pieces of traffic information are to be taken into account in planning the route.

The YES branch of step 430 contains matching records. Then the driver/user is asked in a step 440 whether he should bypass the respective road segment, which has personal, i.e., individual traffic information associated with it, or travel right through. If the driver confirms the bypass option for the respective road segment (YES branch of step 440), the route planning is restarted in step 460 excluding this segment.

However, if the driver wishes to drive right through the respective road segment (NO branch of step 440), the record in the TI database containing the respective traffic information such as traffic problems on the corresponding road segment is deleted from the database, step 450. Thereafter the route is also recalculated and retested, as described previously in step 430, to determine whether the route leads through another road segment that is stored in the TI database as affected by a traffic problem.

Thus, back branching to decision 430 takes place in both the YES branch and the NO branch of step 440. Subsequently the above-described procedure is repeated in the same pattern until no more records of the TI database intersect with segments of the route, so that it is clarified for each segment that is contained in the TI database whether or not it should be bypassed.

Then, in a step 470, a first travel direction is output by output unit 1700.

Figure 5:
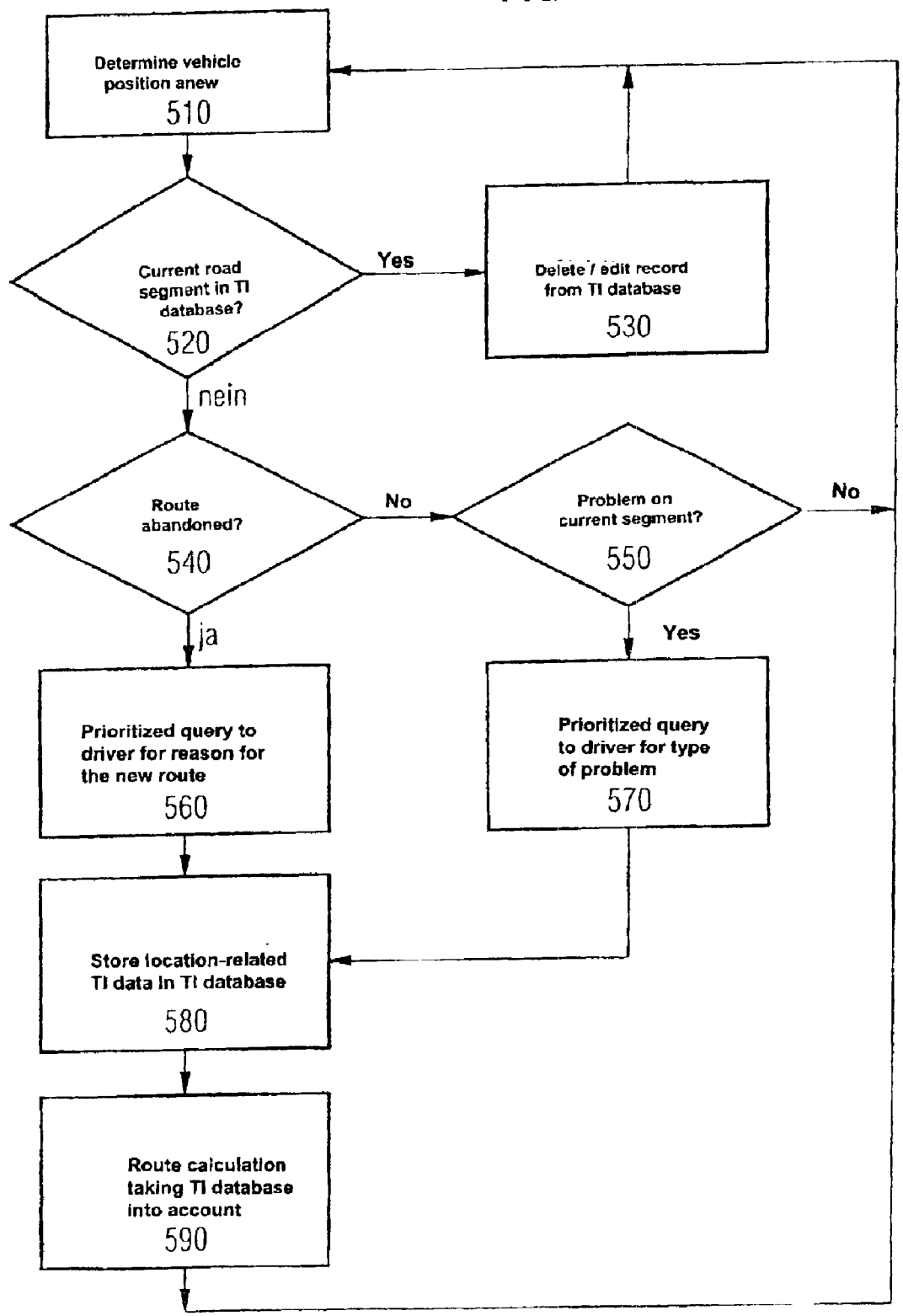
FIG. 5 shows the procedure when managing the TI database during the trip.

FIG. 5 shows the procedure when managing the TI database during the trip.

During the trip, position location by the positioning module of the navigation system takes place continuously in position locator unit 1300. The procedure shown in FIG. 5 is thus continuously repeated during the trip.

In particular, the step of determining the current position of the vehicle, shown as step 510, always takes place first. Subsequently, in a step 520, it is determined, on the basis of the known location and the road segments of the travel route known in unit 1400, whether any of the current road segments matches a road segment in a record of the TI database. If this comparison 520 determines that a record for the current road segment is available in TI database 1810 (YES branch from 520), this record is edited during the trip.

This editing takes place in a step 530. It may include, for example, deleting the record if the traffic information of the record describes a construction site, but the driver travels through this segment at a much higher speed than could ordinarily be assumed for passing through a construction site or because the current speed of the vehicle in the supposed road segment, which can be automatically detected evaluated by the vehicle's sensor system 1500, is higher than a speed value entered as an average speed for the road segment in the TI database. A particularly advantageous feature of the present invention becomes evident here, namely that the traffic information for a certain road segment can be automatically updated. Updating the corresponding record may, however, also include overwriting a speed value present in the record with a current speed value. This current speed value can be computed by the overall system. Subsequently the check returns to step 510, where the vehicle's position is determined again.

In the NO branch of step 520, i.e., when the current road segment is not contained in the TI database, it is verified in a step 540 whether or not the route defined by the system has been abandoned. In the NO branch of step 540, the driver observed the directions of destination guidance unit 1900 and has not deviated from the proposed route. In this case the driver may input his own current traffic observations in the TI database which are not known to the navigation device or have not been signaled. Such traffic observations preferably concern events that are traffic-relevant and thus include, according to a preferred aspect of the present invention, traffic problems in particular. According to another aspect of the present invention, however, other events only having relevance to the individual driver can also be input in the TI database.

The input of a problem is determined by the driver himself and the system is activated accordingly in a step 550 to receive an input in the TI database; however, this can also be done automatically, for example, when the current speed drops below a speed value stored in the system for the respective road segment. This condition is often met, for example, when a new and unannounced highway construction site appears and causes a traffic jam with the corresponding speed reduction.

In this embodiment, a record is input in the TI database in a step 570 by prioritized queries from the system to the driver, primarily querying the reason of the problem. Priorities are preferably assigned in the order of their probability. Such prioritization may have different aspects for different road segments. Preferably suggestions regarding different types of problems are presented consecutively to the driver via output unit 1700 with a prompt to select an option. The driver then selects via input unit 1600 the actual type of problem. Then, in a step 580, a new record is generated in TI database 1810, which has the content obtained by querying the driver. This record is stored. Subsequently, in a step 590, the travel route is recalculated in unit 1400 on the basis of the new information from the TI database. This may mean, in the event of a traffic jam on a highway, for example, that the traffic navigation system proposes leaving the highway at the next exit. Then the system branches back to step 510 for a new vehicle position location.

If in step 540 the driver deviates from the route proposed by the system (YES branch of step 540), he is automatically asked for the reason. This query is also preferably prioritized so that the driver can reject or accept only certain suggestions of the system with yes or no or by pushing a button. For example, in the event of an unplanned exit from a higher-class road to a lower-class one, for example, from a super-highway to a state road, a traffic jam that is unknown to the external traffic information center is assumed if the speed of the vehicle on this road is much lower than the maximum allowed speed.

The information obtained from the driver query or, optionally, the events assumed by the system, are also entered as corresponding traffic information for the respective road segment of the main route and stored in TI database 1810 in a step 580, as described above. Then, also as described above, step 590 is executed and the system branches back to determining the vehicle's position anew.

Although the present invention was described above with reference to a preferred embodiment, it is not limited thereto, but can be modified in many ways.

For example, the driver may select not only one, but several reasons for a traffic problem in the above-mentioned prioritized query if this makes sense semantically. Assumptions for the parameters of the additional route planning are preferably obtained from these reasons. The assumptions obtained are stored then until the respective road segment is next activated for problem prediction. If such assumptions are not confirmed when the vehicle next travels through that road segment, they are overwritten.

In addition, the traffic problems currently obtained from driver queries can also be made available to an external traffic information center in order to update and supplement its traffic situation information.

The different reasons for a traffic problem which are presented to the driver during the prioritized query are preferably managed by an algorithm in TI database 1810. Depending on the number of reasons that can be specified by the system and the diversity of the road network regarding stretches of lower and higher classes, this algorithm may vary in a wide range and it may also take into account empirical data such as time of day, day of the week or seasonal vacation times with increased traffic density on certain road segments.

Furthermore, according to the variant of the overall system shown in FIG. 3, TI database 1810 can also be provided with up-to-date information from an external data center via communications system 1000.

What is claimed is:

1. A method for managing a traffic-relevant event in a vehicle-based navigation system, comprising:

detecting an event associated with at least one road segment of a route from at least one of an event horizon of a vehicle and an event horizon of a driver;

storing information representing the event;

analyzing the event;

processing the analyzed event in order to provide an up-to-date route plan; and enabling a dialog between the driver and the vehicle-based navigation system if the driver abandons a route suggested by the vehicle-based navigation system to make an empirical observation of the driver concerning the at least one road segment available to the vehicle-based navigation system for a driver-specific route planning;

wherein the dialog is used to record a reason why the driver has deviated from the route.

2. The method according to claim 1, wherein the dialog takes place via a voice-controlled system.

3. The method according to claim 1, further comprising:

obtaining the event automatically from the event horizon of the vehicle from a measurement during travel; and storing the event with a respective one of the at least one road segment as an attribute thereof.

4. The method according to claim 1, wherein:

a measurement of the analysis of the event includes at least one of the following quantities:
   an average speed of the vehicle on a respective one of the at least one road segment,
   an evenness of a speed of the vehicle,
   an ambient temperature, and
   a mechanical vibration of the vehicle.

5. The method according to claim 1, further comprising:
storing at least one of a time of day and a day of a week as an attribute with the at least one road segment.

6. The method according to claim 1, further comprising:
assigning the at least one road segment of the route with an attribute that can be input by the driver of the vehicle.

7. The method according to claim 1, wherein:
the step of analyzing the event includes the step of evaluating the event to determine a relevance of the event as a traffic problem.

8. The method according to claim 1, further comprising:
forwarding information obtained from the step of analyzing to an external traffic information center.

9. A device for managing a traffic-relevant event in a vehicle-based navigation system, comprising:
an arrangement for detecting an event associated with at least one road segment of a route from at least one of an event horizon of a vehicle and an event horizon of a driver;
an arrangement for storing information representing the event;
an arrangement for analyzing the event;
an arrangement for processing the analyzed event in order to provide an up-to-date route plan; and
an arrangement for enabling a dialog between the driver and the vehicle-based navigation system if the driver abandons a route suggested by the vehicle-based navigation system to make an empirical observation of the driver concerning the at least one road segment available to the vehicle-based navigation system for a driver-specific route planning;
wherein the dialog is used to record a reason why the driver has deviated from the route.

10. The system according to claim 9, wherein the event is automatically obtained from the event horizon of the vehicle from a measurement during travel, and is stored with a respective one of the at least one road segment as an attribute thereof.

11. The system according to claim 9, wherein a measurement of the analysis of the event includes at least one of the following quantities:
an average speed of the vehicle on a respective one of the at least one road segment,
an evenness of a speed of the vehicle,
an ambient temperature, and
a mechanical vibration of the vehicle.

12. The system according to claim 9, wherein at least one of a time of day and a day of a week is stored as an attribute with the at least one road segment.

13. The system according to claim 9, wherein the at least one road segment of the route is assigned with an attribute that can be input by the driver of the vehicle.

14. The system according to claim 9, wherein the analyzing of the event includes evaluating the event to determine a relevance of the event as a traffic problem.

15. The system according to claim 9, wherein information obtained from the analyzing is forwarded to an external traffic information center.

16. The system according to claim 9, wherein the dialog takes place via a voice-controlled system.

17. A motor vehicle navigation system, comprising:
device for managing a traffic-relevant event in a vehicle-based navigation system, the device including:
an arrangement for detecting an event associated with at least one road segment of a route from at least one of an event horizon of a vehicle and an event horizon of a driver,
an arrangement for storing information representing the event,
an arrangement for analyzing the event,
an arrangement for processing the analyzed event in order to provide an up-to-date route plan; and
an arrangement for enabling a dialog between the driver and the vehicle-based navigation system if the driver abandons a route suggested by the vehicle-based navigation system to make an empirical observation of the driver concerning the at least one road segment available to the vehicle-based navigation system for a driver-specific route planning;
wherein the dialog is used to record a reason why the driver has deviated from the route.

18. A method for managing a traffic-relevant event in a vehicle-based navigation system, comprising:
detecting an event associated with at least one road segment of a route from at least one of an event horizon of a vehicle and an event horizon of a driver;
storing information representing the event;
analyzing the event; and
processing the analyzed event in order to provide an up-to-date route plan;
wherein the driver assigns specific attributes to the at least one road segment of the route.

* * * * *